(12) United States Patent
Hoher

(10) Patent No.: US 6,752,232 B1
(45) Date of Patent: Jun. 22, 2004

(54) DRIVE UNIT

(75) Inventor: Markus Hoher, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/088,880

(22) PCT Filed: Oct. 11, 2000

(86) PCT No.: PCT/EP00/09988

§ 371 (c)(1),
(2), (4) Date: Mar. 21, 2002

(87) PCT Pub. No.: WO01/28801

PCT Pub. Date: Apr. 26, 2001

(30) Foreign Application Priority Data

Oct. 16, 1999 (DE) .......................................... 199 50 047

(51) Int. Cl.$^7$ ........................................... B60K 17/354
(52) U.S. Cl. ...................... 180/247; 180/294; 180/376; 180/385; 192/55.61
(58) Field of Search ................................ 180/247, 248, 180/249, 250, 292, 294, 374, 375, 376, 385; 192/55.61

(56) References Cited

U.S. PATENT DOCUMENTS

| | | | |
|---|---|---|---|
| 3,494,225 A | * 2/1970 | Binder | 74/700 |
| 4,203,498 A | * 5/1980 | Kodama | 180/70 MS |
| 4,205,729 A | * 6/1980 | Morino | 180/55 |
| 4,217,794 A | * 8/1980 | Yasui | 74/700 |
| 4,548,100 A | 10/1985 | Höhn | 74/689 |
| 5,062,517 A | * 11/1991 | Muchmore | 192/106.2 |
| 5,205,373 A | * 4/1993 | Kadokura | 180/248 |
| 5,215,161 A | 6/1993 | Kobayashi | 180/248 |
| 5,339,918 A | * 8/1994 | Nakayama | 180/292 |
| 5,632,354 A | 5/1997 | Kashiwase et al. | 180/344 |
| 5,947,243 A | * 9/1999 | MacDonald | 192/3.29 |
| 6,244,985 B1 | 6/2001 | Wafzig et al. | 476/42 |

FOREIGN PATENT DOCUMENTS

| | | | |
|---|---|---|---|
| DE | 31 18 075 C2 | 2/1983 | F16H/37/02 |
| DE | 196 31 236 A1 | 2/1997 | F16H/37/02 |
| DE | 198 44 374 A1 | 3/2000 | F16H/61/02 |
| DE | 199 43 623 A1 | 3/2001 | B60K/17/346 |
| WO | 99/05433 | 2/1999 | F16H/15/38 |

* cited by examiner

Primary Examiner—Daniel G. DePumpo
(74) Attorney, Agent, or Firm—Davis & Bujold PLLC

(57) ABSTRACT

The drive unit for a motor vehicle, has an input drive shaft connected to a starting element, which unit has an automatic transmission connected to the starting element and also possesses a first output drive shaft, which is connected to the rear wheel drive of a motor vehicle and has a second output drive shaft which is connected to the front wheel drive of the motor vehicle and further possesses a torsion damping mechanism. The second output shaft (1) is located in the motor side area of the drive unit and, seen in the direction of travel, is disposed in front of the starting element (3), transverse to the input drive shaft, while the torsion damping mechanism (2) is placed in front of the second output drive (1).

8 Claims, 1 Drawing Sheet

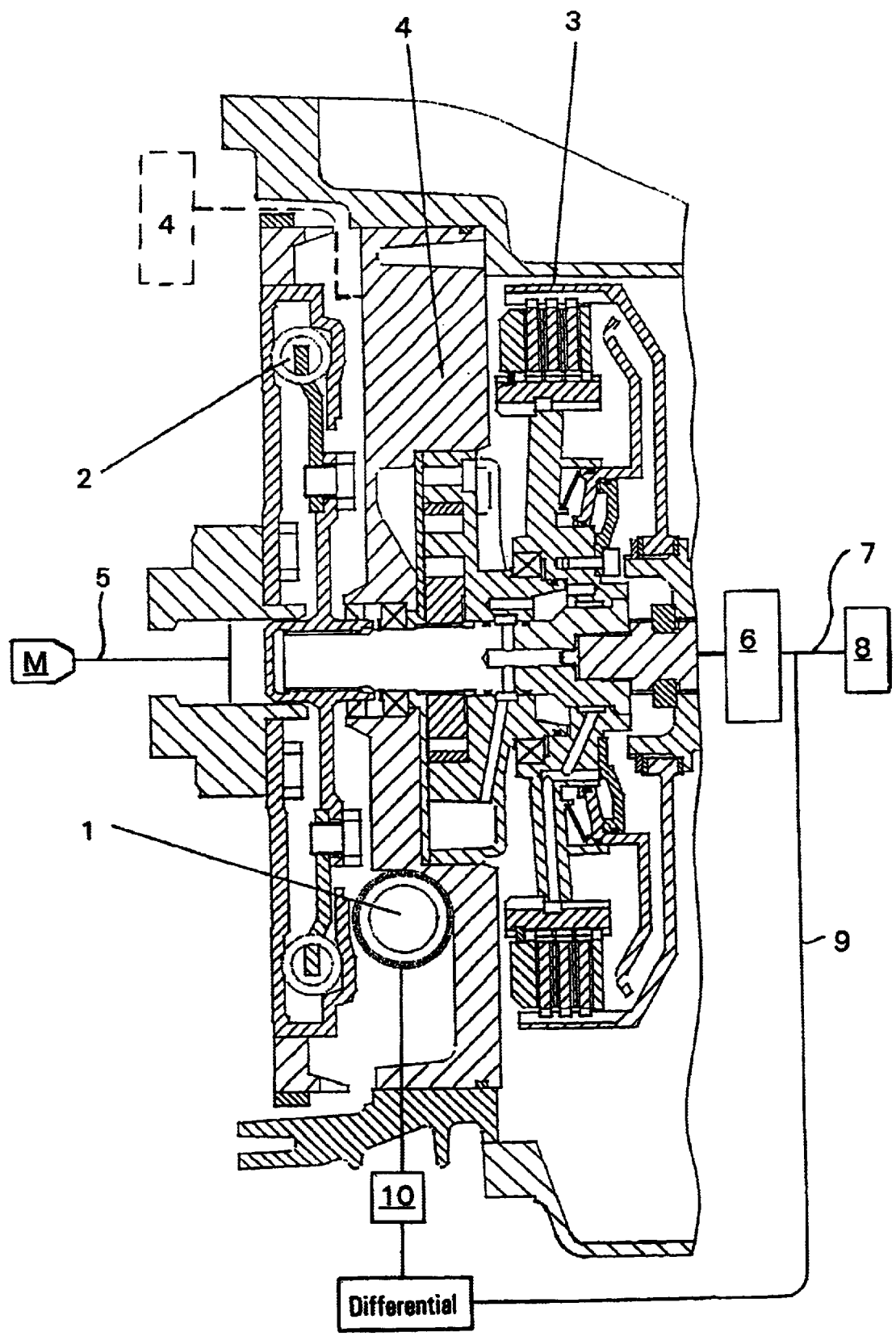

DRIVE UNIT

FIELD OF THE INVENTION

The present invention concerns a drive unit for motor vehicles, which unit has an input drive shaft connected to a starting element, and which unit further has an automatic transmission connected to that starting element. The said drive unit also possesses a first output drive shaft, which is connected to the rear wheel drive of the motor vehicle and has a second output drive shaft which is connected to the front wheel drive of the motor vehicle. In addition the drive unit possesses a torsion damping means.

BACKGROUND OF THE INVENTION

Automatic drives can be stepping drives, for instance, 4, 5, or 6 shift drives. They may also be stepless, i.e. continuously variable transmissions (hereinafter CVT).

Stepless drives are known in a multiplicity of arrangements in the classifications of positive engagement (belt transfer) or in friction disk drives. Thus the DE 198 44 374.9 of the applicant describes a CVT in the form of a conical V-belt drive, which has a first separable V-belt pulley pair on a input drive shaft and a second separable V-belt pulley pair on an input drive shaft, wherein each pulley pair is comprised of one axially immovable first disk and a second axially slidable second disk (respectively primary disk and secondary disk). Between the V-belt pulley pairs runs an encircling organ, for example, a steel thrust belt. The displacement of the primary disk or the secondary disk is effected by a pressure medium with aid of an electronic control apparatus, which, by means of an electromagnetic solenoid piston and a hydraulic valve regulates the level of the pressure positional space of the primary disk and the secondary disk.

A friction disk drive is, for example, described in the WO 99/05433, also of the applicant. This drive possesses input and output disks placed disposed successively on a common shaft, and are placed pairwise to one another. The inner surfaces thereof are designed in a toroidal shape and friction disks are placed between the said pairs of the input and the output disks. These friction disks stand in frictional contact both with the input disks as well as with the output disks and transfer the torque transmitted to them from the input disks to the output disks through frictional contact, whereby the speed of rotation lies just so much higher, the greater the separating distance is between their contact points with the input disk and the axis of rotation. The speed of rotation of the output disk is just so much greater, on the other hand, the closer the contact points lie between the friction disk and the output disk to the axis of rotation. By pivoting the friction disks, accordingly, the speed of rotation of the output disk can be optionally adjusted in a stepless manner. For this purpose, the rotating axles of the friction disks are placed on a carrier structure, which can be regulated by a pivoting apparatus. The two input disks of the two drive units are thus affixed to rotate with a torque shaft, while the two output disks of the two drive units, which are in mirror image of one another, and disposed beside one another in the transmission, are placed in a common bushing, which is rotatably located on the torque shaft. The torque shaft is penetrated by an input shaft, which is connected with a starting element of a motor vehicle, for example a torque converter or connected to a wet running starting clutch of the driving machine (motor) of the vehicle.

In the patent application DE 199 43 623.1 of the applicant, a drive unit for a motor vehicle is described, which, besides the stepless transmission in the form of the said steel thrust belt or a friction disk drive, exhibits a multiplicity of additional and necessary components for the input drive of a vehicle, and which said drive unit can be installed both as a drive unit for the input drive of an axle as well as a drive unit for the input drive of two axles, that is, the front axle and the rear axle of a motor vehicle. To this end, the drive unit described therein exhibits a housing with an input drive, with a starting element connected to the input drive, with a stepless transmission connected to the starting element, with a transfer gear connected to the stepless transmission, which possesses a first input drive, which is connected with the rear wheel drive and possesses a second input drive which is connected with a differential for the front wheel drive, whereby at least one of the half axles between the differential and the front axle drive and the corresponding front wheel penetrates the housing between the starting element and the stepless transmission.

So that the drive unit may be installed as an all-wheel drive for the vehicle, the transfer gear which is integrated into the housing possesses a center differential for the splitting of the torque to the rear axle and the front axle of the motor vehicle provided with this drive unit.

Further, the possibility exists, of so designing the transfer gear, that the entire torque transmitted from the stepless transmission is exclusively directed to the rear axle drive of the vehicle and, indeed, by means of by-passing the connection between the transfer gear and the front axle differential, so that this drive unit becomes exclusively available for the said rear axle.

This design of the drive unit as a standard drive unit or a all-wheel drive unit reduces the manufacturing costs and thereby the maintenance on the bearings.

Thus the purpose of the invention is, to make optimum use of the construction space for this drive unit as well as to reduce said space.

SUMMARY OF THE INVENTION

In accord with the invention, provision is also made, that the second output shaft in the motor side area of the drive unit, viewed in the direction of travel, is placed transverse to the input drive shaft and that the torsion damping means, again seen in the direction of travel, is disposed in front of the second output drive shaft.

With the design of the drive unit in accord with the invention, the components can be so constructed, that the expense of the manufacture, independent of the presence of the transversely arranged second output shaft remains unchanged. Thereby, several identical parts suitable for different drive applications, that is, standard drives or all-wheel drives, become possible. The torsion damping means can be easily made to fit, independent of the generally employed starting elements of the motor world, whereby likewise, more identical parts become useable.

BRIEF DESCRIPTION OF THE DRAWING

The invention will now be described, by way of example, with reference to the accompanying drawings in which:

FIG. 1 is a partial section through a drive unit designed in accord with the invention is presented.

DETAILED DESCRIPTION OF THE INVENTION

In this single figure, the components are shown, which are assembled within a (not shown in detail) housing, that is, integrated therein, and which comprise an invented drive unit. This drive unit possesses, thus, an input drive 5, which is connected with a starting element 3, as well as an automatic transmission 6, which is connected to said starting element 3. The said unit possesses further a first output drive shaft 7, which is connected with the rear wheel drive 8 of the motor vehicle, a second output drive shaft 9, which is connected with the front drive 10 of the motor vehicle as well as having a torsion damping element 2. The starting element 3 is either a start clutch or a torque converter and the stepless transmission is either a steel chain drive or a friction disk drive (diagrammatically shown in FIG. 1 as transmission 6), such as were described in more detail in the more descriptive entry of the patent application.

In accord with the invention, provision is made in the case of the drive unit, that the half shaft 1 in the motor side area of the drive unit and, viewed in the direction of travel, is placed in front of the starting element and transverse to the input drive shaft, whereby the torsion damping element 2, again as seen in the direction of travel, is disposed in front of the half shaft 1.

The starting element 3 can be designed as a wet starting clutch or as a torque converter and is installed, again seen in the direction of travel, after the transversely set half shaft 1, in order to optimize the usage of the available construction space. An oil supply system with a pump 4 is provided to the starting element 3, which, seen in the direction of travel, can be provided before the starting element 3 or after the said starting element 3. In the presented embodiment, the oil supply system 4 is placed before the starting element 3, which latter is constructed as a wet starting clutch.

As has been further explained above, an optimized installation space utilization has been achieved by means of the placement of the half shaft 1 between the torsion damping means 2 and the starting element 3, so that this space may be further reduced.

The torsion damping means 2 can be easily made to fit, independent of the generally employed starting element 3 known in the motor art. Further, a "Flex-plate", serving as a flexible connection plate between the crankshaft flange and the as converter flange, can be integrated into the torsion damping means 2.

Reference Numbers and Items

1 Output shaft
2 Torsion damping means
3 Starting element
4 Oil supply

What is claimed is:

1. A transmission unit for motor vehicles, which unit has an input drive shaft connected to a starting element, an automatic transmission connected to said starting element and a first output drive shaft, for connection to a rear wheel drive of a motor vehicle, a second output drive shaft connected to a differential of a front wheel drive of a motor vehicle and a torsion damping means, wherein a half axle (1) extending from the differential on a motor side area of the drive unit, seen in the direction of travel, is disposed in front of the starting element (3), transverse to the input drive shaft, and in that the torsion damping means (2), as viewed in the direction of travel, is placed in front of said half axle (1).

2. The transmission unit according to claim 1, wherein the starting element (3) is a wet starting clutch.

3. The transmission unit according to claim 1, wherein an oil supply system (4) is provided for the starting element (3).

4. The transmission unit according to claim 3, wherein the oil supply system (4) is placed on that side of the torsion damping means (2) which is proximal to the starting element (3).

5. The transmission unit according to claim 3, wherein the oil supply system (4) is placed on the side of the torsion damping means (2) which is remote from the starting element (3).

6. The transmission unit according to claim 1, wherein the automatic transmission is a CVT transmission.

7. The transmission unit according to claim 6, wherein the automatic transmission is a friction disk transmission.

8. The transmission unit according to claim 6, wherein the automatic transmission is a stepped transmission.

* * * * *